United States Patent Office 2,712,389
Patented July 5, 1955

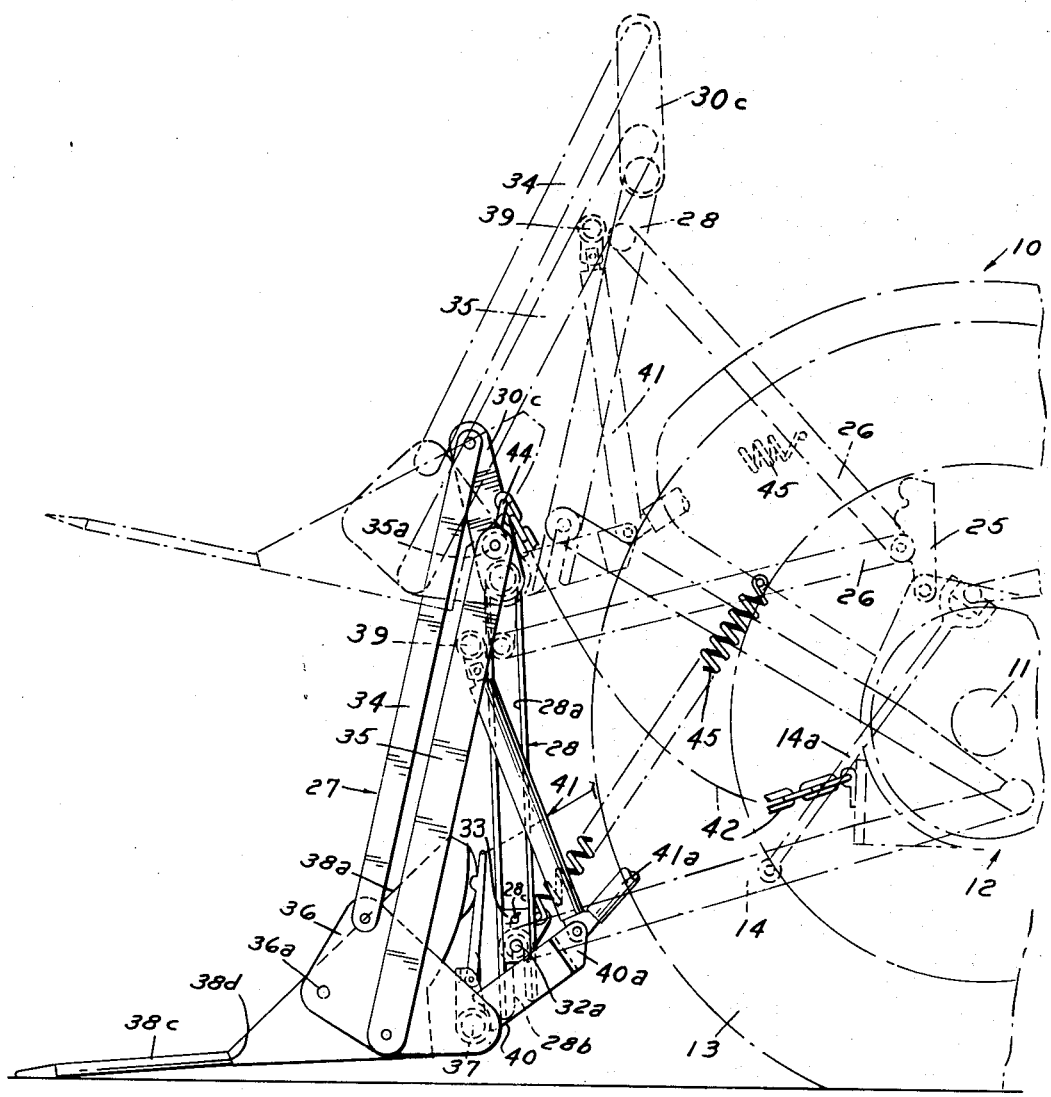

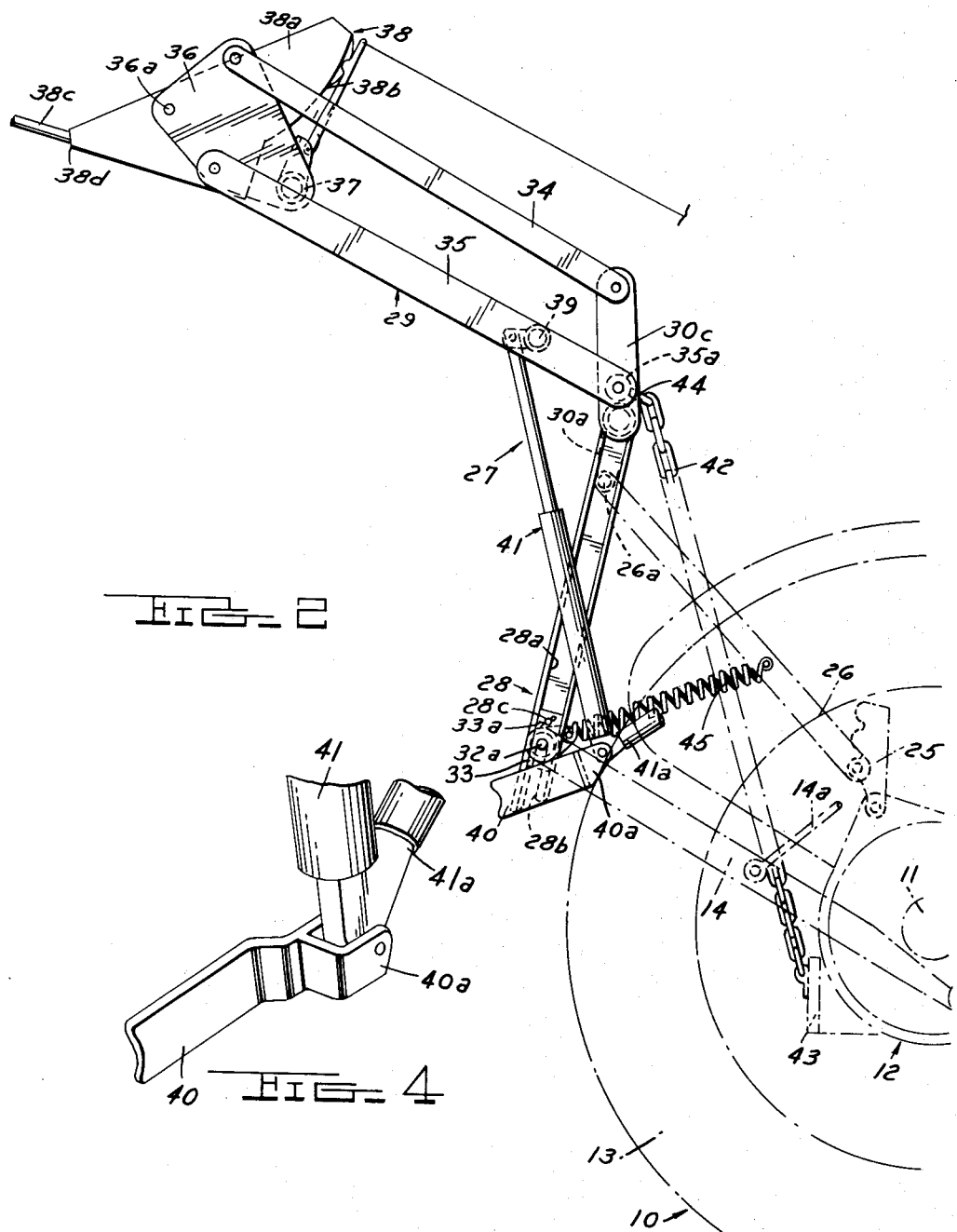

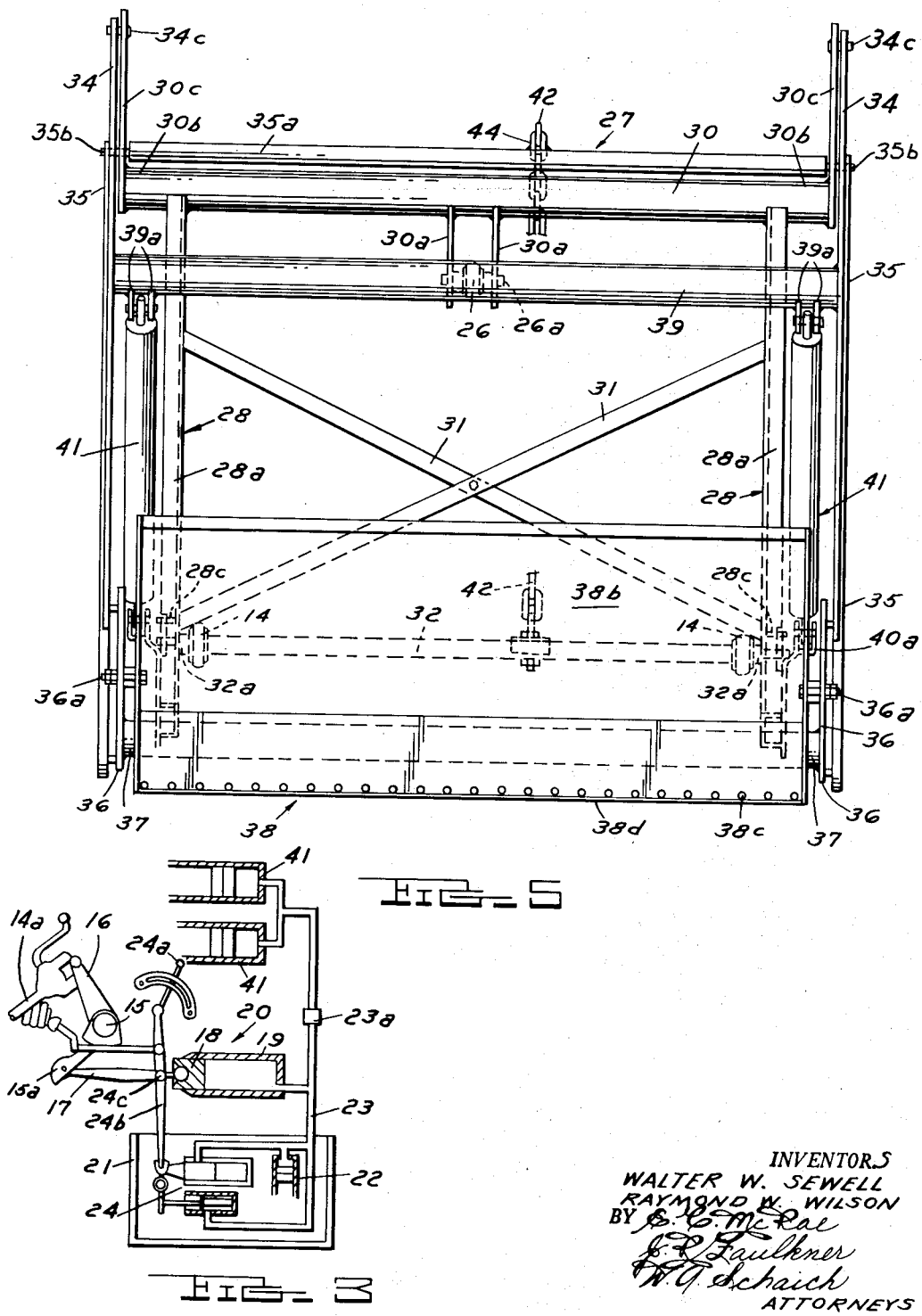

2,712,389

TRACTOR MOUNTED REAR END LOADER

Walter W. Sewell, Washington, and Raymond W. Wilson, Ferndale, Mich., assignors to Ford Motor Company, Dearborn, Mich., a corporation of Delaware Application October 22, 1953, Serial No. 387,706

3 Claims. (Cl. 214—140)

This invention relates to tractor mounted loaders. More specifically this invention relates to a rear mounted loader for tractors having built-in hydraulic systems and vertically swingable, trailing draft links actuatable by said hydraulic systems.

Rear mounted loaders for tractors have heretofore been disclosed. Such loaders, in most instances, have included mechanical linkages whereby the boom thereof is elevated by raising movement of the tractor draft links. More recently, tractor mounted loaders have been disclosed wherein hydraulic cylinders are incorporated into the loader structure itself to assist in lifting the boom. In such prior loaders, however, the additional hydraulic cylinders were generally connected in parallel with the built-in cylinder of the tractor hydraulic system and hence were controlled by the conventional control linkage provided on the tractor which controls the supply of fluid to the built-in tractor cylinder. Such hydraulic systems always incorporated an automatic cut off of fluid supply when the built-in tractor cylinder reached a certain degree of extension and such cut off necessarily meant that the fluid could no longer be supplied to the additional lifting cylinders. Hence, unless separate control valves or hydraulic pumps were provided, it was not possible to obtain a sequential action of the built-in tractor cylinder and the auxiliary lifting cylinders, which action is desirable to provide the loader with both high break-away load characteristics and extended reach.

Accordingly, it is an object of the present invention to provide an improved rear mounted loader for tractors having trailing, hydraulically-lifted draft links.

It is another important object of the present invention to provide an improved rear mounted loader for such tractors wherein hydraulic cylinders incorporated into the loader structure are controlled by the built-in hydraulic system of the tractor and automatically actuated in fixed sequence with the movement of the tractor's draft links produced by the hydraulic system of the tractor.

It is a further object of the present invention to provide an improved rear mounted loader which is quickly and easily mounted on or demounted from a tractor having power lifted draft links.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a side view of the present loader as it appears when connected to the power-lifted draft links of a tractor, and shows the loader in ground-engaging, loading position, in solid outline, and also shows the loader in a partially raised position in dotted outline.

Figure 2 is a view similar to Figure 1, showing the present loader in a fully raised position.

Figure 3 is a schematic view of hydraulic system of a tractor having vertically swingable draft links, to which the loader of the present invention can be attached for use.

Figure 4 is an enlarged detail view, in perspective, showing the mounting of the lower end of a loader cylinder.

Figure 5 is a rear elevational view of the loader.

As shown on the drawings:

Numeral 10 relates generally to a tractor having a rear axle 11 rotatably mounted within a rear axle and differential housing 12. A pair of rear wheels 13 are mounted on the ends of rear axle 11. Tractor 11 is fitted with a pair of power-liftable draft links 14 which are pivotally connected at their forward ends to laterally spaced points on rear axle housing 12.

As shown schematically in Figure 3, tractor 10 contains a "built-in" hydraulic system indicated generally at 20, by which the draft links 14 are power-lifted. The upper portion of differential housing 12 is fitted with a rotatable rock shaft 15, having a pair of rock arms 16 fixedly secured to its exposed ends. Rock arms 16 are respectively connected with the draft links 14 by means of connecting rods 14a. Rock shaft 15 is fitted with a depending arm 15a having a socket in its lower end to receive the ball end of a thrust link 17. The other or forward ball end of this thrust link is socketed in the outer end of a piston 18. Piston 18 is operatively mounted in a cylinder 19 and coacts therewith to constitute the hydraulic ram of the hydraulic system 20. Hydraulic system 20 further includes an oil reservoir 21 and a pump 22 to supply pressured fluid to cylinder 19 via line 23. A control valve 24 is interposed in line 23 and is adapted to permit oil to be pressured into cylinder 19, to hold the fluid in cylinder 19 static or to permit fluid to be exhausted from cylinder 19, for respectively lifting, holding or lowering draft links 14. Control valve 24 is actuatable by means of a manual quadrant lever 24a and a linkage 24b. Linkage 24b includes a pin 24c which is engageable by the rear end of piston 18, at its extreme outer position, thereby moving the valve 24 to a neutral position to hold piston 18 in such extreme position. Further description of the manner in which the hydraulic cylinder 20 is employed to operate the present loader will appear below.

Tractor 10 is also fitted with a rocker 25, pivotally mounted on the upper part of the differential housing 12. A top link 26 of adjustable length is pivotally connected at its forward end to rocker 25. The trailing ends of draft links 14 and top link 26 provide a three-point implement suspension system.

As best shown in Figures 2 and 5, a loader embodying this invention is indicated generally at 27 and includes an inverted U-shaped support frame 28, a boom frame 29 and other parts to be hereinafter described. Support frame 28 comprises a pair of laterally spaced upstanding channel iron support members 28a, having a tubular cross member 30 welded across their upper ends and projecting a short distance therebeyond. A pair of X-braces 31 are connected between support members 28a to add rigidity to the support frame 28. As shown in Figure 1, the lower ends of support members 28a are each provided with a slot 28b and a pin 28c, spaced a short distance above the terminal end of said slot. A draw bar 32, comprising an elongated rectangular steel bar, terminating in shaft-like ends 32a, is connected between the trailing ends of draft links 14. The ends 32a of draw bar 32 project beyond the draft link connections and such ends are slipped up into the slots 28b for lifting of, and attachment to, frame 28. The draw bar ends are locked in place in the upper ends of slots 28b by means of square metal plates 33, Figure 1, which are provided with apertures adapted to fit over pins 28c and the projecting ends 32a of draw bar 32. Plates 33 are held in position by cotter pins 33a.

The cross member 30 of support frame 28 is provided at its median point with a pair of laterally spaced depending lugs 30a. Lugs 30a are transversely apertured for the reception of a pin 26a for connection with the trailing end of top link 26.

The projecting ends 30b of support frame member 30 each have an upstanding plate 30c welded thereto. Each of plates 30c has an upper boom arm 34 and a lower boom arm 35 pivotally attached thereto. The pivotal connection for the upper arms 34 comprise pivot pins 34c, Figure 5. However, the pivotal connection for the lower arms 35 comprises a shaft 35a having reduced diameter shaft ends 35b. The shaft ends 35b extend through apertures in the lower ends of arms 30c. The arms 35 are welded in parallel relationship to the projecting ends of shaft 35a. Thus shaft 35a rotates as arms 35 move upward with lifting of boom 27. The other ends of boom arms 34 and 35 are pivotally connected at spaced points to a pair of plates 36. Plates 36 are spaced apart the same distance as are plates 30c, by means of a tubular cross member 37, welded therebetween. A material handling device 38 of any desired configuration is pivotally mounted at at points 36a between plates 36. The particular material container 38 shown on the drawings is of the manure loader type and comprises a pair of end plates 38a which are joined by a sheet steel bottom and back portion 38b. A series of horizontally aligned steel tines 38c are secured to the edge 38d of scoop bottom 38b.

A tubular member 39 is welded between boom arms 35 near the pivotal connection of said arms with support frame arms 30c. As best shown in Figure 5, pairs of spaced, depending lugs 39a are welded near each end of cross member 39, adjacent arms 35. These pairs of lugs 39a are apertured. As shown in Figure 4, a strap-like arm 40 is welded to the lower end of each of the main frame channel members 28a. Arms 40 are welded across the sides of arms 28a and therefore do not interfere with the slots 28b which receive the ends 32a of draw bar 32. The forward ends of arms 40 are bifurcated as at 40a and a pair of hydraulic cylinder and piston assemblies 41 are connected between said bifurcated portions 40a and the aforementioned lugs 39a, attached to boom frame member 39. Flexible hydraulic lines 41a connect the piston and cylinder assemblies 41 in parallel fluid circuit with the tractor ram cylinder 19. A threaded pipe connection is provided on the top of tractor differential housing 12 to which lines 41a are connected. This connection is illustrated as point 23a in Figure 3.

As shown in solid outline in Figure 1, the rear ends of the aforementioned arms 40 engage the tubular cross member 37 of boom frame 29 when the boom is lowered, and thus provide thrust points for pushing the material handling element 38 into a pile of material for loading.

Automatic control for the present loader, i. e., the sequential activation of first the tractor ram piston 18 and then the loader cylinders 41, is effected through the medium of a chain 42 or any suitable flexible tension element. Chain 42 is fastened at its one end to a steel plate 43, bolted to differential housing 12. The other end of chain 42 is connected, as by welding, to a lug 44, welded to the aforedescribed boom pivot shaft 35a. Lug 44 can be positioned at any point along pivot shaft 35a which will permit chain 42 to remain operatively clear of top link 26. As shown in Figure 5, lug 44 is spaced just off center of shaft 35a to clear top link 26. Lug 44 is welded in a generally upright position on shaft 35a, as shown in Figure 1, when boom 27 is in a down position. Chain 42 is of such length that it is drawn taut at a point just before lift arms 14 reach their extreme top lift position. Since lift arms 14 are operatively connected to tractor ram piston 18, this delay point represents a position of ram piston 18, just before said piston 18 strikes the control pin 24c, Figure 3, to neutralize valve 24.

As shown in the lowered position in Figure 1, a tension spring 45 is connected between tractor draw bar 32 and a forward portion of top link 26. Spring 45 exerts an upward bias on the lower end of loader frame 28 and tends to lift the same and increase the pressure within cylinder 41. Of course it will be obvious that spring 45 can be connected between support frame 28 and boom frame 29 to provide the same result. Cylinders 41 are of smaller diameter and consequently require higher operating pressure than ram cylinder 19, and since they are connected in parallel to said ram cylinder, they are actuated only after ram cylinder 19 meets sufficient resistance to build pressure therein equal to that necessary to operate cylinders 41.

*Operation*

When valve 24 is opened, pressured fluid is supplied in parallel to ram cylinder 19, and to loader cylinders 41. Since ram cylinder 19 has a substantially greater area than loader cylinders 41, ram piston 18 will be moved first and loader 27 will be lifted upward in a folded condition by links 14 until chain 42 becomes taut, thereby limiting further upward movement of frame 28, links 14, and ram piston 18. The tightening of chain 45 immediately causes a pressure increase in cylinder 19 and fluid flows to cylinders 41 thereby lifting boom frame 29 toward the upper lift limits of cylinder 41. As cylinders 41 move frame 29 upwardly, lug 44 is swung forward and downward, thereby permitting additional upward movement of frame 28. Cylinders 41 and 18 thus arrive at their extreme lift positions simultaneously with the neutralization of valve 24, caused by piston 18 engaging control pin 24c.

Both spring 45 which continues to bias cylinders 41 against boom frame 29 and the higher pressure loading of cylinders 41 cause the reverse action to be effected when loader 27 is lowered. When valve 24 of tractor hydraulic system 20 is moved to a lowering position, i. e., opened to allow oil to flow from cylinders 19 and 41 to sump 21, the higher pressure loading within cylinders 41 will cause the oil therein to move out preferentially to that oil contained in ram cylinder 19. Thus boom 29 is lowered and the loader is folded; oil then drains from ram cylinder 19 and the folded loader is returned to ground level.

It will thus be understood that an improved tractor mounted loader is provided by the present invention. The loader advantageously employs hydraulic cylinders connected in parallel with the tractor hydraulic lifting ram and automatically operated in sequence with the tractor ram to provide a high lift loader. The described loader is simple, easy to manipulate and is automatic in its action, requiring only the manipulation of the standard control lever which is employed to actuate the tractor's draft links.

It will, of course, be understood that various details of construction may be varied through a wide range without departing from the principles of this invention and it is, therefore, not the purpose to limit the patent granted hereon otherwise than necessitated by the scope of the appended claims.

We claim:

1. For use with a tractor having a power lifted link, a first hydraulic cylinder for elevating said link and a hydraulic system controlling the supply of fluid to said cylinder, said hydraulic system including means for automatically interrupting flow of hydraulic fluid to said first cylinder when said link is elevated to an extreme position; a loader comprising a first frame structure mountable on said link and movable therewith, a boom frame structure, means pivotally attaching said boom frame structure to said first frame structure for pivotal movement relative thereto in a vertical plane, a second hydraulic cylinder pivotally mounted between said first frame structure and said boom frame structure, conduit means for fluid connecting said second hydraulic cylinder in parallel relationship with said first hydraulic cylinder, whereby pressured hydraulic fluid is supplied concurrently to said cylinders, and a flexible tension element connected between a stationary point on said tractor and to a point on said boom frame structure to thereby limit the upward movement of said first frame structure prior to said link reaching its said extreme elevated position, said flexible tension element being attached to said boom frame structure at a point located relative to the axis of pivotal connection of the boom frame structure so as to move downwardly as said boom frame structure is pivoted upwardly relative to said first frame structure, thereby permitting additional lifting movement of said first frame structure until said link reaches its said extreme position of elevation.

2. For use with a tractor having a trailing, power-lifted draft link, a cylinder and piston operatively connected to said draft link for raising and lowering the same, a hydraulic system including a shiftable control valve for controlling a flow of oil to said cylinder and piston, a control linkage for said valve having an abutment thereon, and said abutment being engageable by said piston at the extreme end of its lifting stroke to shift said valve to interrupt fluid flow to said cylinder; a loader comprising a support frame mountable on said draft link and movable therewith, a lifting frame, means pivotally attaching said lifting frame to said support frame for pivotal movement in a vertical plane, a second hydraulic cylinder fluid connected to said hydraulic system in parallel with said first mentioned cylinder, means pivotally connecting said second cylinder between said lifting frame and said support frame to elevate the free end of said lifting frame, and a flexible tension element connected between said tractor and said lifting frame to thereby limit the upward movement of said support frame prior to said piston reaching its said extreme end of its lifting stroke, said flexible tension element being attached to said lifting frame at a point located relative to the axis of pivotal movement of the lifting frame so as to move downwardly as said lifting frame is elevated, thereby permitting additional lifting movement of said support frame until said piston reaches said extreme end of its lifting stroke.

3. The loader defined in claim 2 including biasing means urging said boom frame downwardly against the lifting force of said second cylinder.

References Cited in the file of this patent

UNITED STATES PATENTS 2,638,237　　Struthers et al. _____ May 12, 1953